(12) United States Patent
Lee et al.

(10) Patent No.: US 11,296,536 B2
(45) Date of Patent: Apr. 5, 2022

(54) CHARGING POWER SUPPLYING SYSTEM USING MOTOR DRIVING SYSTEM

(71) Applicants: Hyundai Motor Company, Seoul (KR); Kia Motors Corporation, Seoul (KR)

(72) Inventors: Yong Jae Lee, Gyeonggi-do (KR); Jae Ho Hwang, Daejeon (KR); Joo Young Park, Gyeonggi-do (KR); Su Hyun Bae, Daegu (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 137 days.

(21) Appl. No.: 16/679,436

(22) Filed: Nov. 11, 2019

(65) Prior Publication Data
US 2020/0373781 A1    Nov. 26, 2020

(30) Foreign Application Priority Data

May 20, 2019    (KR) .......................... 10-2019-0058986

(51) Int. Cl.

| | | |
|---|---|---|
| *H02J 1/10* | (2006.01) | |
| *H02J 7/16* | (2006.01) | |
| *H02P 27/08* | (2006.01) | |
| *B60L 53/22* | (2019.01) | |
| *B60L 53/62* | (2019.01) | |
| *B60L 1/00* | (2006.01) | |

(Continued)

(52) U.S. Cl.
CPC ................ *H02J 7/16* (2013.01); *B60L 1/006* (2013.01); *B60L 50/64* (2019.02); *B60L 53/22* (2019.02); *B60L 53/53* (2019.02); *B60L 53/62* (2019.02); *H02P 27/08* (2013.01)

(58) Field of Classification Search
CPC .. H02J 7/16; H02P 27/08; B60L 53/22; B60L 53/62; B60L 1/006; B60L 53/53; B60L 50/64
USPC .......................................................... 307/20
See application file for complete search history.

(56) References Cited

U.S. PATENT DOCUMENTS

2005/0258796 A1* 11/2005 Kusaka ................... B60L 50/40
                                                          318/801

FOREIGN PATENT DOCUMENTS

| KR | 20180060454 A | 6/2018 |
|---|---|---|
| KR | 1020190119778 A | 10/2019 |

(Continued)

*Primary Examiner* — Daniel Cavallari
*Assistant Examiner* — Dru Parries
(74) *Attorney, Agent, or Firm* — Mintz Levin Cohn Ferris Glovsky and Popeo, P.C.; Peter F. Corless (57) ABSTRACT

A charging power supplying system using a motor driving system includes an inverter that is connected to a battery, includes at least one switching device, and is configured to change an on/off state of the switching device and to convert power stored in the battery to output the converted power to an output terminal of the inverter, a motor including a plurality of coils that each receive power provided from the output terminal of the inverter, a charging power output terminal that is connected to a neutral point to which the plurality of coils of the motor is commonly connected and outputs current output from the neutral point to an external charging target, and a controller configured to control the switching device in the inverter based on current of the output terminal of the inverter.

8 Claims, 10 Drawing Sheets

(51) Int. Cl.
  *B60L 53/53*  (2019.01)
  *B60L 50/64*  (2019.01)

(56) References Cited

FOREIGN PATENT DOCUMENTS

| KR | 20200068175 A | 6/2020 |
| KR | 20200075937 A | 6/2020 |

* cited by examiner

CHARGING POWER SUPPLYING SYSTEM USING MOTOR DRIVING SYSTEM

CROSS REFERENCE TO RELATED APPLICATION

The present application claims under 35 U.S.C. § 119(a) the benefit of Korean Patent Application No. 10-2019-0058986, filed on May 20, 2019, the entire contents of which are incorporated by reference herein.

BACKGROUND

1. Technical Field

The present disclosure relates to a charging power supplying system using a motor driving system, more particularly, to the charging power supplying system using the motor driving system for supplying charging power to a second vehicle to charge a battery included in the second vehicle.

2. Description of the Related Art

In general, an electric vehicle or a plug-in hybrid vehicle converts power supplied from external charging equipment into a state appropriate for battery charging in a vehicle and supplies the converted power to the battery to charge the battery. The battery applied to the electric vehicle or the plug-in hybrid vehicle is an element for storing electric energy supplied to a motor that generates vehicle power and has high voltage. Accordingly, charged power supplied from electric vehicle supply equipment (EVSE) needs to also have high voltage with which a high-voltage battery is capable of being charged.

Due to such high voltage of the battery, the battery applied to the electric vehicle or the plug-in hybrid vehicle is not capable of being charged by simple connection with a battery of another surrounding vehicle (i.e., a second vehicle) via a jump cable.

In particular, in the case of an electric vehicle that does not include another vehicle power source other than an electric motor, when a battery is discharged, it is not possible to move a battery to a charging station for battery charging. To overcome this problem, in the case of an electric vehicle, a vehicle manufacturer manages mobile charging equipment including a separate high-voltage battery and a high-voltage converter and provides a service for charging an electric vehicle of a customer.

As such, when a battery of an electric vehicle or the like is discharged, a charging service needs to be provided in order to drive a vehicle, and thus customer inconvenience is caused, and accordingly, this may contribute to customer hesitancy to purchase an electric vehicle.

Conventionally, to overcome the problem, a method of providing a separate cable for vehicle-to-vehicle battery charging is proposed. However, in this method, a customer needs to also purchase a separate cable, and thus the cost is increased.

The contents described as the related art have been provided only to assist in understanding the background of the present disclosure and should not be considered as corresponding to the related art known to those having ordinary skill in the art.

SUMMARY

An object of the present disclosure is to provide a charging power supplying system using a motor driving system for providing power of a battery included in a vehicle as charging power for charging a battery of another (i.e., a second or external) vehicle by using a motor driving system configured to drive a motor.

According to an embodiment of the present disclosure, a charging power supplying system using a motor driving system includes an inverter that is connected to a battery, includes at least one switching device, and is configured to change an on/off state of the switching device and to convert power stored in the battery to output the converted power to an output terminal of the inverter, a motor including a plurality of coils that each receive power provided from the output terminal of the inverter, a charging power output terminal that is connected to a neutral point to which the plurality of coils of the motor is commonly connected and outputs current output from the neutral point to an external charging target, and a controller configured to control the switching device in the inverter based on current of the output terminal of the inverter such that an amplitude of current output to the charging power output terminal from the neutral point follows a preset current command.

The controller may determine a duty of the switching device in the inverter based on a difference between a current detection value obtained by detecting current output from the neutral point and a preset neutral point current command, and direct current (DC) link voltage corresponding to voltage of a side of the battery of the inverter.

The controller may include a current control device including a subtracter configured to calculate a difference between a current detection value obtained by detecting current output from the neutral point and a preset neutral point current command, a control device configured to generate a voltage command value V* for allowing a calculation result of the subtracter to converge on '0', and a divider configured to determine a first switching duty of the switching device in the inverter, which corresponds to a ratio of direct current (DC) link voltage corresponding to voltage of an input terminal of the side of the battery of the inverter and the voltage command value.

The controller may further include a nonlinearity compensator configured to generate a nonlinearity compensation duty for compensating for nonlinearity of the inverter based on a detection value of DC link voltage of the inverter and a detection value of the neutral point current, and an adder configured to add the first switching duty and the nonlinearity compensation duty to generate a correction duty.

The controller may further include a current unbalance reduction control unit configured to correct the correction duty to allow a difference between an average value of detection values of currents flowing in coils with a plurality of phases of the motor and a detection value of each of the currents flowing in the coils with the plurality of phases to converge on '0', and to generate a separate duty determined for each switching device connected to the coils with the plurality of phases.

The current unbalance reduction control unit may include a plurality of subtracters configured to each calculate a difference between the average value of the detection values of the currents flowing in the coils with the plurality of phases of the motor and the detection value of each of the currents flowing in the coils with the plurality of phases, a plurality of control devices configured to each generate a duty value for allowing a calculated value of the plurality of subtracters to converge on '0', and a plurality of adders configured to add the correction duty to each of duty values generated by the plurality of control devices to the correction duty to each generate a separate duty of the switching device in the inverter connected to the coils with the plurality of phases.

The current unbalance reduction control unit may include a plurality of subtracters configured to each calculate a difference between an average value of the detection values of the currents flowing in the coils with the plurality of phases in the motor and a detection value of each of currents flowing in remaining phases except for one of currents flowing in coils with a plurality of phases, a plurality of control devices configured to each generate a duty value for allowing a calculated value of the plurality of subtracters to converge on '0', a first adder configured to change a sign of the duty values generated by the plurality of control devices and to add resulting values, and a plurality of second adders configured to add each of the duty values generated by the plurality of control devices and a duty value added by the first adder to the correction duty to respectively generate separate duties of the switching device in the inverter connected to the coils with the plurality of phases.

The controller may further include a signal output unit configured to generate and output a switching device driving signal corresponding to the separate duty for driving the switching device.

The signal output unit may generate the switching device driving signal to perform interleaved switching on switching devices connected to each phase of the motor.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a charging power supplying system using a motor driving system according to various embodiments will be described with reference to the accompanying drawings.

Figure 1:
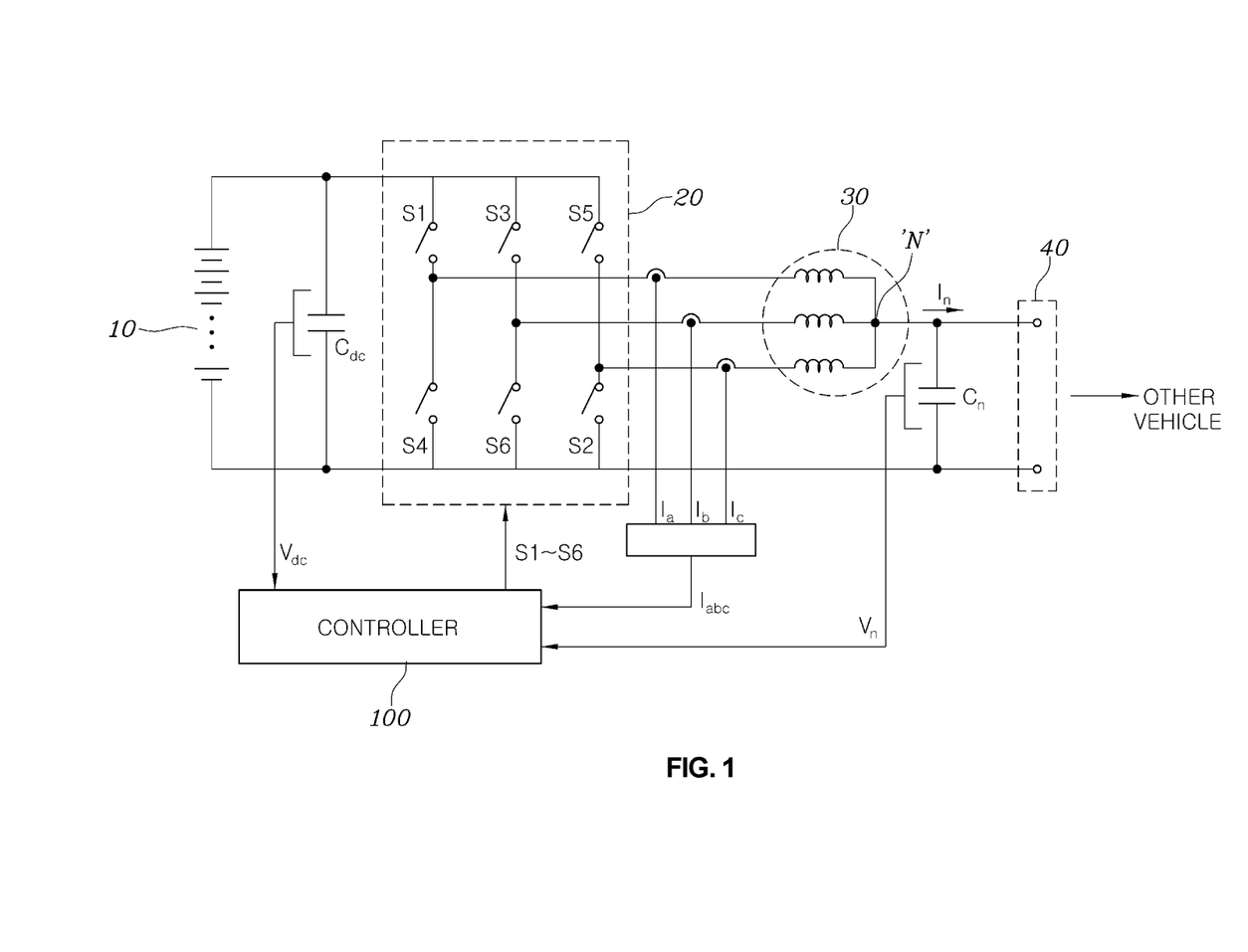
FIG. 1 is a circuit diagram of a charging power supplying system using a motor driving system according to an embodiment of the present disclosure.

FIG. 1 is a circuit diagram of a charging power supplying system using a motor driving system according to an embodiment of the present disclosure.

Referring to FIG. 1, the charging system according to an embodiment of the present disclosure may be a system for outputting power stored in a battery 10 that is an energy storage device to a charging power output terminal 40 connected to a neutral point N of a motor 30 in the form of predetermined constant current through a system provided to drive the motor 30.

In general, the system for driving the motor 30 may include the battery 10 that is an energy storage device for storing power for driving the motor 30, and an inverter 20 configured to convert direct current (DC) power stored in the battery 10 into three-phase alternating current (AC) and to provide the AC to the motor 30. The inverter 20 may include three legs that are connected in parallel to opposite ends of the battery 10, two switching devices (two of S1 to S6) may be connected in series to each leg, and one-phase driving power may be supplied to the motor 30 from a connection node of the two switching devices. In order to drive the motor, pulse width modulation control of switching devices S1 to S6 in the inverter 20 may be performed to supply current to the motor 30 by as much as a current command corresponding to torque of the motor 30, which is to be acquired by driving the motor 30.

Differently from the aforementioned case when a motor is driven, according to various embodiments of the present disclosure, the switching devices S1 to S6 of the inverter 20 may be controlled to output current with a desired amplitude to the neutral point N of the motor 30, and thus the system for driving the motor included in a vehicle may be operated as if the system is external charging equipment (e.g., electric vehicle supply equipment (EVSE)).

When a connection terminal at a side of the battery 10 of the inverter 20 is considered as input and the neutral point N of the motor 30 is considered as output, switching devices (e.g., switching devices S1 and S4 included in a leg corresponding a-phase of the motor 30) included in a leg corresponding to one phase of the inverter 20 and a coil of a corresponding phase of the motor 30 may configure one voltage converter. Each leg of the inverter 20 may be connected in parallel to the side of the battery 10, and thus in the case of a system for driving a three-phase motor, it may be seen that a connection structure of the inverter 20 and the motor 30 is configured by connecting three voltage converters in parallel to the side of the battery 10. Accordingly, the plurality of voltage converters that are connected in parallel to each other may be simultaneously operated, may be selectively operated, or may be operated in an interleaved manner, and accordingly power of the battery 10 may be output to the neutral point of the motor 30.

In this case, a voltage converter formed by the connection structure of the inverter 20 and the motor 30 may be operated in substantially the same way as charging equipment that performs control to output constant current and provides constant current.

According to an embodiment of the present disclosure, the charging power supplying system using the motor driving system may include the battery 10, the inverter 20 that is connected to the battery 10, includes the plurality of switching devices S1 to S6, and is configured to change an on/off state of the switching devices S1 to S6 and to convert power stored in the battery 10 to output the converted power to an output terminal of the inverter 20, the motor 30 including a plurality of coils that each receive power provided from the output terminal of the inverter 20, the charging power output terminal 40 that is connected to the neutral point N to which the plurality of coils of the motor 30 is commonly connected and outputs current output from the neutral point N to an external charging target, and a controller 100 configured to control a switching device in the inverter based on current of the output terminal of the inverter 20 such that an amplitude of current output to the charging power output terminal 40 from the neutral point N follows a preset current command.

In the charging power supplying system, it may be important to control current in a balance state when charging power is provided to a neutral point of the motor 30. Three-phase currents of the motor may be unbalanced owing to motor unbalance, inverter unbalance, or etc. This unbalance of the phase currents should be removed to prevent the motor from generating torque. In other words, currents provided by a plurality of converter circuits each of that is composed the leg L1 or L2 or L3 of the inverter 20 and a coil (inductor) of the motor 30 need to be determined to be equal to each other. When currents corresponding to respective phases of the motor 30 do not satisfy the three-phase balance, torque may be generated from the motor 30, movement, shake, and the like of a vehicle may be caused if the motor 30 is a vehicle driving motor. In order to prevent this phenomenon, current unbalance reduction control is required.

When charging power is provided to a neutral point of the motor 30, it may be important to maximize the efficiency of the charging system. When the efficiency of the charging system is low, fuel efficiency may be low, and heat corresponding thereto is generated, and accordingly, a problem may arise in a cooling system. In addition, the durability of the motor or the inverter is also adversely affected, and thus it may be important to enhance the efficiency of the charging system.

In consideration of this, the controller 100 of the charging power supplying system according to various embodiments of the present disclosure may maintain current of the charging power supplying system of the motor 30 and then may perform control for removing unbalance of current flowing through paths corresponding to respective phases of the motor 30 or the inverter 20. In addition, the controller 100 may perform control for enhancing charging efficiency.

According to various exemplary embodiments of the present disclosure, the controller 100 may be embodied using a non-volatile memory configured to store data about an algorithm configured to control the operation of various components of the vehicle or data about software commands for reproducing the algorithm, and a processor configured to perform the following operations using the data stored in the corresponding memory. Here, the memory and the processor may be embodied in separate chips or may be embodied in a single integrated chip. The processor may be configured in the form of one or more processors.

Figure 2:
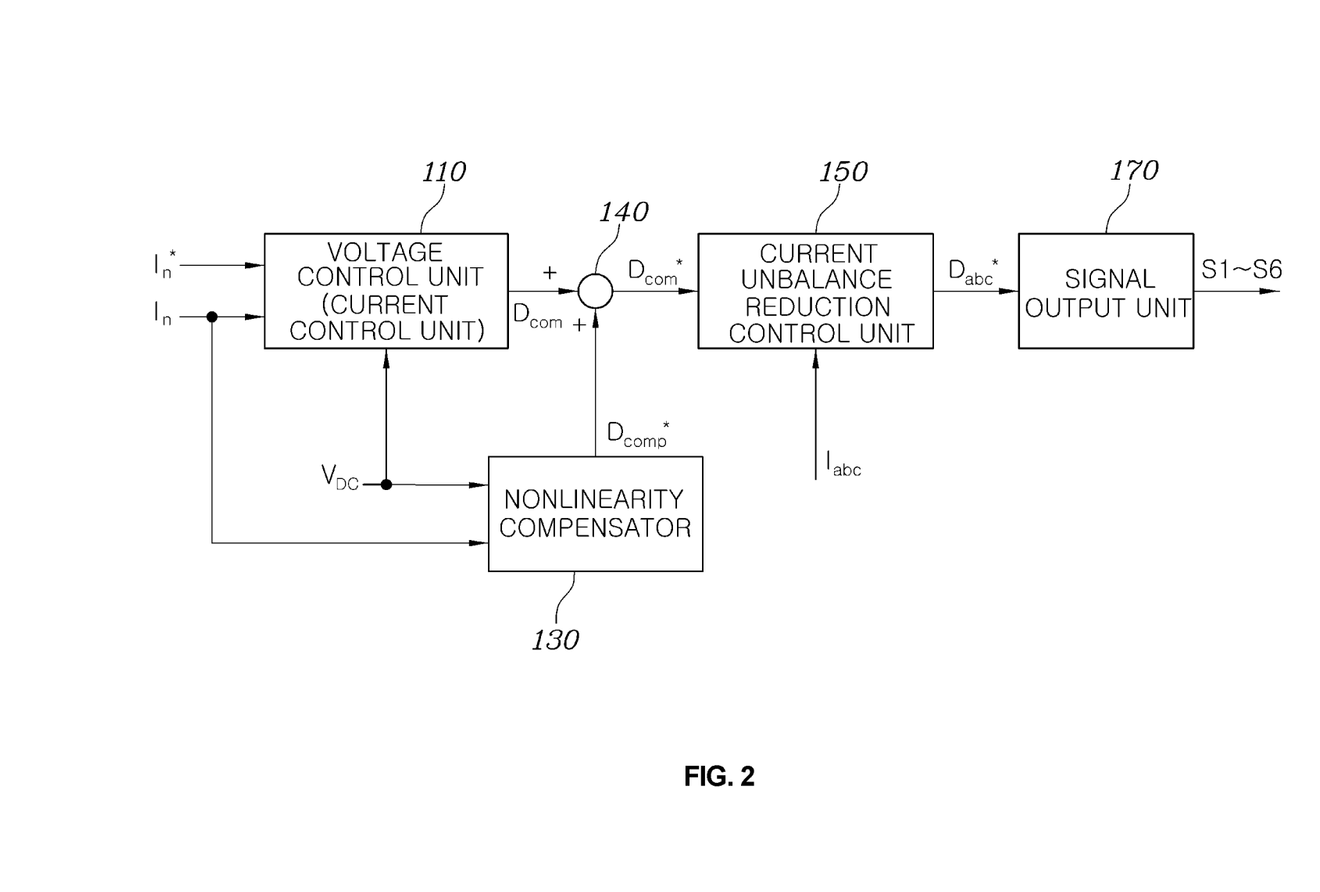
FIG. 2 is a detailed block diagram showing an example of a configuration of a controller of a motor driving system according to an embodiment of the present disclosure.

FIG. 2 is a detailed block diagram showing an example of a configuration of a controller of a motor driving system according to an embodiment of the present disclosure.

Referring to FIG. 2, the controller 100 of the motor driving system according to an embodiment of the present disclosure may include a current control unit 110 configured to compare a current command $I_n^*$ that is a target value of neutral point current with a size of a current detection value obtained by detecting neutral point current of the motor 30 and to determine a duty of the switching devices S1 to S6 of the inverter 20 such that the current detection value follows the current command $I_n^*$.

Figure 3:
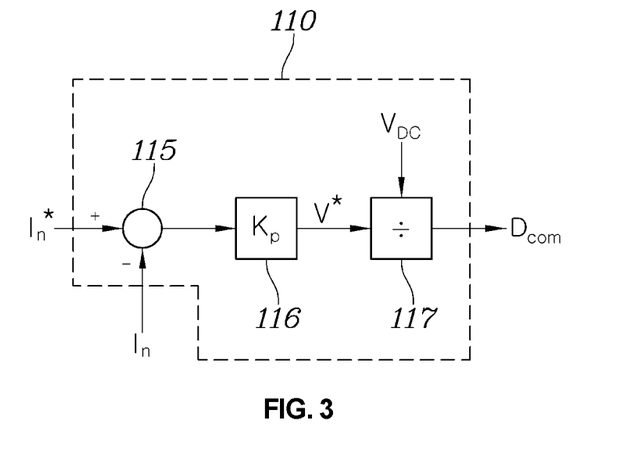
FIG. 3 is a detailed diagram showing a configuration of a current control unit of the controller illustrated in FIG. 2.

FIG. 3 is a detailed diagram showing a configuration of a current control unit of the controller illustrated in FIG. 2.

Referring to FIG. 3, a voltage control unit 110 may include a subtracter 115 configured to calculate a difference between the current command $I_n^*$ of the target value of neutral point current and the current detection value $I_n$ obtained by detecting current output to the neutral point N of the motor 30, a control device 116 configured to generate a voltage command value V* to allow a calculated value of the subtracter 115 to converge on '0', and a divider 117 configured to determine a switching duty $D_{com}$ of the switching devices S1 to S6 in the inverter 20, which corresponds to a ratio between a DC link voltage $V_{DC}$ of an input terminal of the side of the battery 10 of the inverter 20 and the voltage command value V*.

The current control unit 110 may derive the voltage command value V* that is a target value of a neutral point voltage, for allowing an error between the current detection value $I_n$ obtained by detecting the neutral point current of the motor 30 and the current command $I_n^*$ of the current of the neutral point to converge on '0', via the general control device 116 such as a proportional controller (a P controller), a proportional integral controller (a PI controller), or a proportional integral derivative controller (PID), and may calculate a conversion ratio of a converter circuit formed by the coil of the motor 30 and the switching devices S1 to S6 of the inverter 20, which corresponds to a ratio between the derived voltage command value V* and the DC link voltage $V_{DC}$ that is the voltage of the input terminal of the side of the battery 10 of the inverter 20, as the duty $D_{com}$ of the switching device.

Here, the current detection value $I_n$ of neutral point current may be calculated by summing values obtained by detecting currents corresponding to respective phases of the motor by a current sensor included in the output terminal of the inverter 20.

According to an embodiment of the present disclosure, the controller may further include a nonlinearity compensator 130 configured to generate a compensation duty $D_{comp}*$ that is added to the duty $D_{com}$ output from the current control unit 110 to compensate for the nonlinearity of the inverter 20.

Here, the nonlinearity of the inverter refer to a difference between input and output due to a dead time of a switching device, an on/off delay time of an inverter driving circuit, the unique characteristic of the switching device, and the like for safe driving of the inverter. Due to the nonlinearity, there may be a difference between a duty calculated by a control algorithm and a voltage of the inverter and between an actually output duty and the voltage of the inverter. The nonlinearity may cause control error, reduction in dynamic characteristics, and the like, and thus needs to be compensated for.

In order to compensate for the nonlinearity of the inverter 20, the nonlinearity compensator 130 may include a data map configured to pre-store the nonlinearity compensation duty $D_{comp}*$ which corresponds to the DC link voltage $V_{DC}$ of the inverter 20 and the neutral point current detection value $I_n$ output from the neutral point N of the motor 30.

Figure 4:
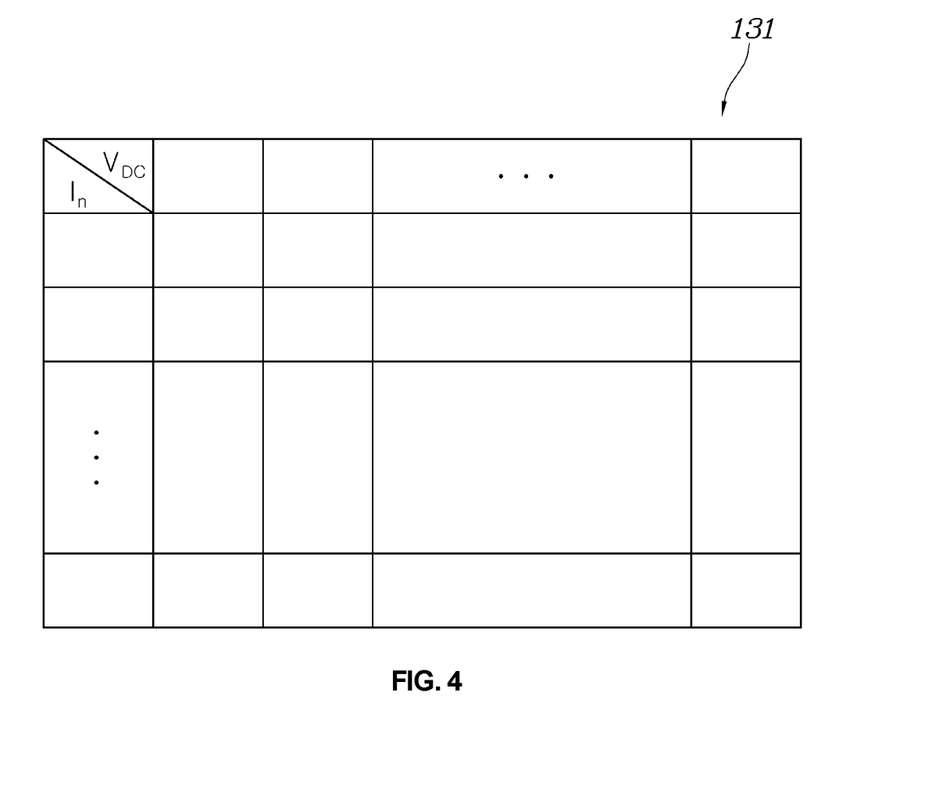
FIG. 4 is a diagram showing an example of a data map of the nonlinearity compensator in the controller illustrated in FIG. 2.

FIG. 4 is a diagram showing an example of a data map of the nonlinearity compensator in the controller illustrated in FIG. 2.

The nonlinearity compensator 130 may include a data map 131, as shown in FIG. 4. The data map may previously derive the nonlinearity compensation duty $D_{comp}*$ which corresponds to the DC link voltage $V_{DC}$ and the neutral point current detection value $I_n$ output to the neutral point N of the motor 30 using an experimental method and may store the nonlinearity compensation duty $D_{comp}*$. During charging control, the nonlinearity compensator 130 may receive a detection value obtained by detecting the DC link voltage $V_{DC}$ of the inverter 20 through a voltage sensor (not shown) and the neutral point current detection value Land may output the nonlinearity compensation duty $D_{comp}*$ which corresponds to the detection value of the DC link voltage $V_{DC}$ of the inverter 20 and the detection value of the neutral point current detection value $I_n$ from the data map, as shown in FIG. 4.

An adder 140 may add the nonlinearity compensation duty $D_{comp}*$ output from the nonlinearity compensator 130 to the duty $D_{com}$ output from the voltage control unit (or the current control unit 110 to generate a correction duty $D_{com}*$. Here, the correction duty $D_{com}*$ may be a duty that is commonly applied to converter circuits corresponding to respective phases of the motor 30 and the inverter 20.

When on/off of the switching devices S1 to S6 of the inverter 20 is controlled using the correction duty $D_{com}*$, a level of the neutral point voltage $V_n$ may be controlled such that the neutral point voltage $V_n$ or the current $I_n$ of the motor 30 follows the current command $I_n*$ that is a target value of preset neutral point current and the inverter 20 may also be controlled to compensate for the nonlinearity of the inverter 20.

The correction duty $D_{com}*$ may be a duty that is commonly applied to a plurality of converter circuits corresponding to respective phases of the motor 30 or the inverter 20. That is, in FIG. 1, one leg of the inverter 20 may be connected for each one-phase coil of the motor 30, a one-phase coil and one leg may form one converter circuit, and the correction duty $D_{com}*$ may be a duty that is commonly applied to switching devices of legs configuring the entire converter circuits. As described above, in converter circuits corresponding to respective phases, the motor 30 and the inverter 20 may have unbalance, and thus control may be needed to remove the unbalance. To this end, according to an embodiment of the present disclosure, the controller may include a current unbalance reduction control unit 150, as shown in FIG. 2.

Figure 5:
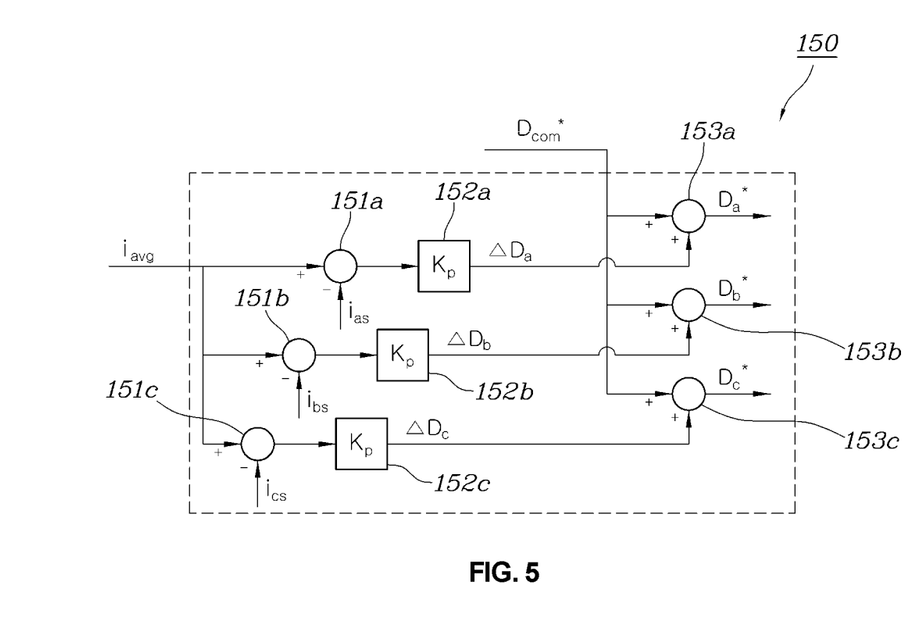
FIGS. 5 and 6 are detailed diagrams showing various example of a configuration of the current unbalance reduction control unit of the controller illustrated in FIG. 2.
Figure 6:
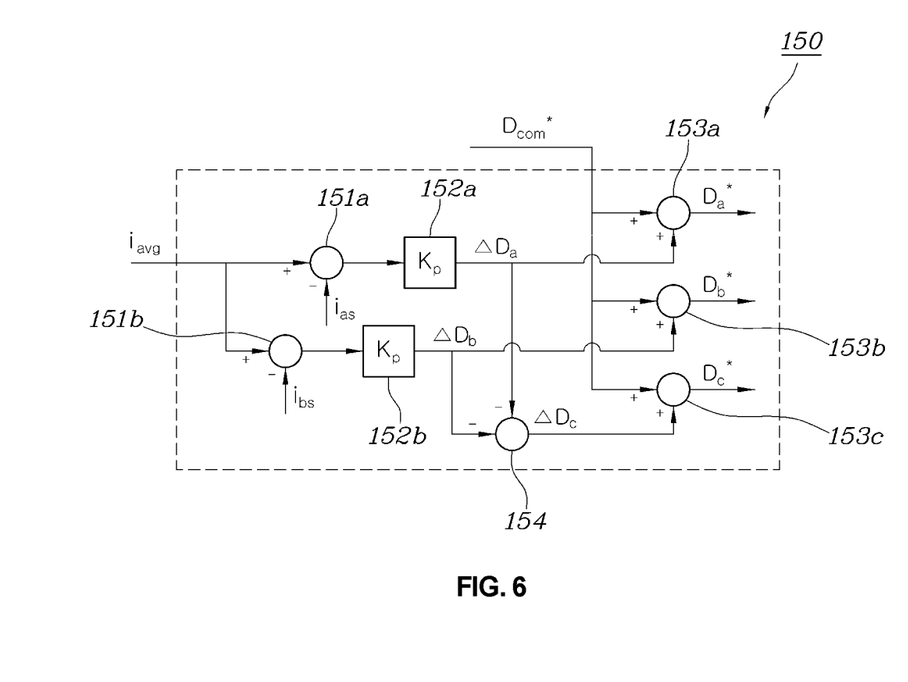

FIGS. 5 and 6 are detailed diagrams showing various example of a configuration of the current unbalance reduction control unit of the controller illustrated in FIG. 2.

First, referring to FIG. 5, the current unbalance reduction control unit 150 may include a plurality of subtracters 151a, 151b, and 151c configured to calculate a difference between an average value $i_{avg}$ of sensing values $i_a$, $i_b$, and $i_c$ obtained by detecting current flowing in coils with a plurality of phases in the motor 30 and sensing values $i_a$, $i_b$, and $i_c$ of current flowing in coils with a plurality of phases, a plurality of control devices 152a, 152b, and 152c configured to respectively generate duty values $\Delta D_a$, $\Delta D_b$, and $\Delta D_c$ for allowing a calculated value of the plurality of subtracters 151a, 151b, and 151c to converge on '0', and a plurality of adders 153a, 153b, and 153c configured to add each of the duty values $\Delta D_a$, $\Delta D_b$, and $\Delta D_c$ generated by the plurality of control devices 152a, 152b, and 152c to a second duty $D_{com}*$ to respectively generate separate duties $D_a*$, $D_b*$, and $D_c*$ of the switching device of the inverter 20 connected to coils with a plurality of phases.

In the above configuration, the plurality of control devices 152a, 152b, and 152c may perform control such that currents $i_a$, $i_b$, and $i_c$ flowing in respective coils with plural phases in the motor 30 follows the average value $i_{avg}$ thereof. Accordingly, currents with the same amplitude may flow in a plurality of converter circuits including coils with plural phases in the motor 30 to overcome the unbalance of the motor 30 or the inverter 20, and accordingly, torque of the motor 30 may be prevented from being generated to overcome danger of moving or movement of a vehicle during charging.

Referring to FIG. 6, in another example, the current unbalance reduction control unit 150 may include a plurality of subtracters 151a and 151b configured to calculate a difference between the average value $i_{avg}$ of the detection values $i_a$, $i_b$, and $i_c$ of current flowing in coils with a plurality of phases in the motor 30 and sensing values $i_a$ and $i_b$ of current flowing in the remaining phases except for one of currents flowing in coils with a plurality of phases, a plurality of control devices 152a and 152b configured to respectively generate duty values $\Delta D_a$ and $\Delta D_b$ for allowing the calculated value of the plurality of subtracters 151a and 151b to converge on '0', a first adder 154 configured to change a sign of the duty values $\Delta D_a$ and $\Delta D_b$ generated by the plurality of control devices 152a and 152b and to add the same, and a plurality of second adders 153a, 153b, and 153c configured to add each of the duty values $\Delta D_a$ and $\Delta D_b$ generated by the plurality of control devices 152a and 152b and a duty value $-\Delta D_a - \Delta D_b$ added by the first adder 154 to the second duty $D_{com}*$ to respectively generate separate duties $D_a*$, $D_b*$, and $D_c*$ of the switching device in the inverter 20 connected to coils with a plurality of phases.

In an example illustrated in FIG. 6, a duty control value of a switching device of a converter circuit including a coil with one phase among a plurality of phases is not generated. The example is based on the fact that the correction duty $D_{com}*$ that is a common duty is not affected and output voltage is controlled according to intention when the sum of separate duties of the switching device of each converter circuit is 0.

FIGS. 5 and 6 illustrate an example in which a proportional controller (a P controller) is applied to the control devices 152a, 152b, and 152c in order to simplify a circuit and to perform a rapid control operation, but a proportional integral controller (a PI controller), a proportional integral derivative controller (a PID controller), or the like, which are well known to one of ordinary skill in the art, may be selectively applied.

The controller 100 may further include a signal output unit 170 configured to generate and output a switching device driving signal corresponding to a separate duty $Dth_c*$ for separately controlling the switching device of a converter circuit corresponding to each phase of the motor 30.

Figure 7:
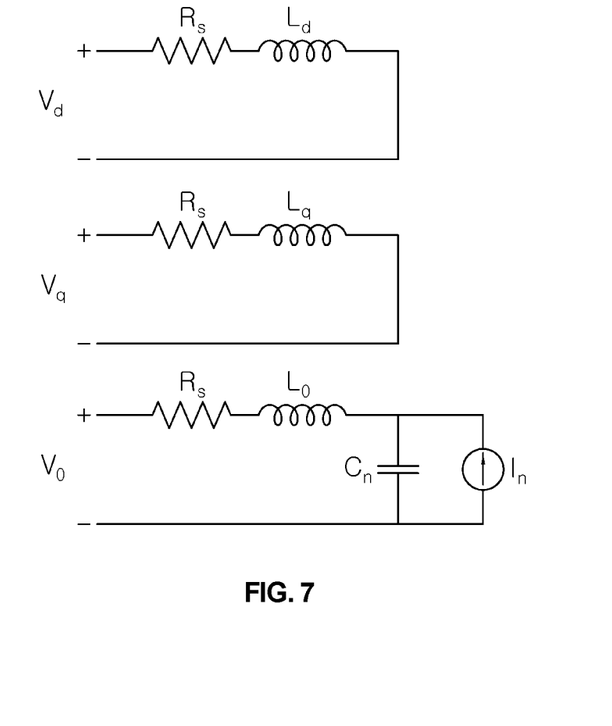
FIG. 7 is a diagram showing dq0 model of a motor.
Figure 8:
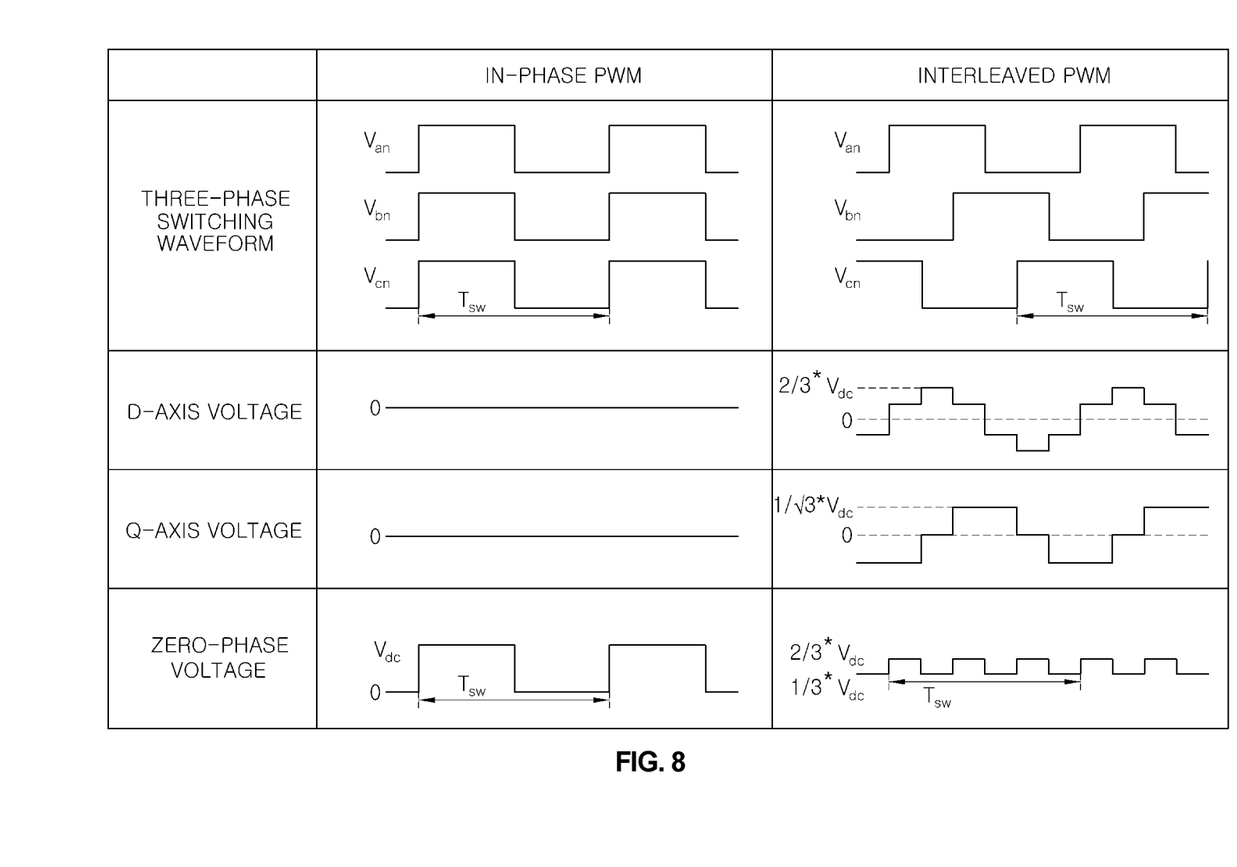
FIG. 8 is a diagram showing comparison between in-phase switching control and interleaved switching control of a switching device of a converter circuit corresponding to each phase of a motor or an inverter according to an embodiment of the present disclosure.

FIG. 7 is a diagram showing dq0 model of a motor. FIG. 8 is a diagram showing comparison between in-phase switching control and interleaved switching control of a switching device of a converter circuit corresponding to each phase of a motor or an inverter according to an embodiment of the present disclosure.

Referring to FIGS. 7 and 8, in the case of in-phase switching, D-axis and Q-axis voltage ripple is not present, but zero-phase voltage ripple is formed with the same frequency as a switching frequency and has great amplitude of $V_{dc}$. However, in the case of interleaved switching D-axis and Q-axis voltage ripple is present, but a frequency of zero-phase switching ripple is three times greater than that of in-phase and has small amplitude of $V_{dc}/3$.

In general, amplitude of current ripple is inversely proportional to a frequency and is proportional to voltage amplitude, and thus when an interleaved switching method is used, amplitude of zero-phase current ripple is 1/9 of in-phase switching.

When the interleaved switching method is used, D-axis and Q-axis voltage pulses, but in general, D-axis and Q-axis inductance has larger amplitude than zero-phase inductance, and thus amplitude of phase current ripple is not largely increased. In addition, only zero-phase current may flow in a capacitor $C_n$, and thus the size of the capacitor is not affected by D-axis and Q-axis voltage and current ripple.

According to an embodiment of the present disclosure, the signal output unit 170 may generate a switching device driving signal to perform interleaved switching on switching devices of a converter circuit corresponding to each phase of the motor 30 or the inverter 20, i.e., switching devices connected to coils with plural phases of the motor 30, and thus loss due to a converter circuit including the switching devices S1 to S6 of the inverter 20 and the coil of the motor 30, thereby enhancing efficiency.

Figure 9:
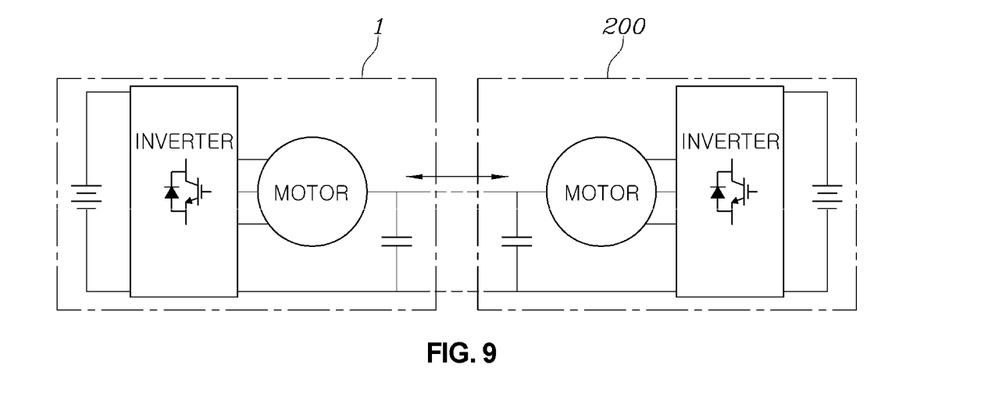
FIGS. 9 to 11 are diagrams showing various examples of a motor driving system according to an embodiment of the present disclosure.
Figure 10:
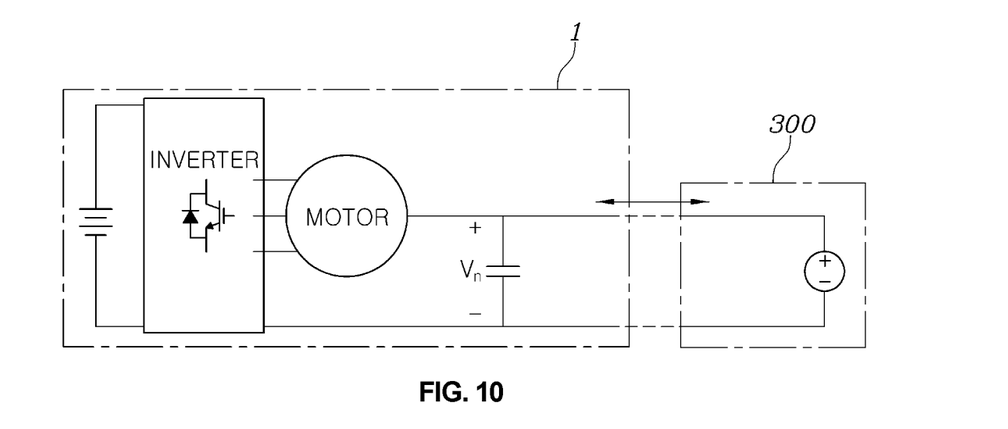
Figure 11:
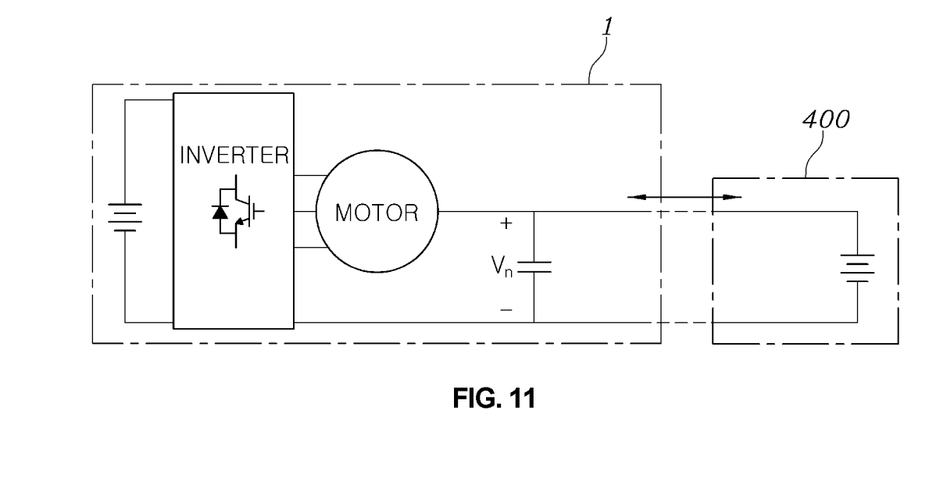

FIGS. 9 to 11 are diagrams showing various examples of a motor driving system according to an embodiment of the present disclosure.

FIG. 9 illustrates the case in which a motor driving system 1 is applied to charge a battery of a second vehicle 200 according to an embodiment of the present disclosure. In this case, the second vehicle 200 may include a similar system to the motor driving system 1 according to an embodiment of the present disclosure and may receive power provided from the motor driving system 1 according to an embodiment of the present disclosure through a neutral point of a motor to charge an internal battery of the second vehicle 200. The motor driving system 1 according to an embodiment of the present disclosure may receive power from the second vehicle 200 and may operate as a charger for charging the internal battery with the received power through appropriate control.

FIG. 10 illustrates the case in which the motor driving system 1 supplies power to a DC system 300 according to an embodiment of the present disclosure. The motor driving system 1 according to an embodiment of the present disclosure may also output voltage corresponding to voltage of the DC system to supply power to the DC system. The motor driving system 1 according to an embodiment of the present disclosure may receive power from the DC system 300 and may also operate as a charger for charging the internal battery with the received power through appropriate control.

FIG. 11 illustrates the case in which the motor driving system 1 supplies power to a battery 400 according to an embodiment of the present disclosure. The motor driving system 1 according to an embodiment of the present disclosure may output charging voltage of a battery 400 to charge the battery 400. The motor driving system 1 according to an embodiment of the present disclosure may receive power from the external battery 400 and may charge an internal battery with the received power through appropriate control.

The charging power supplying system using the motor driving system may stably supply current with predetermined amplitude to a neutral terminal of a motor using a motor driving system included in a vehicle, and thus may supply charging power for charging a battery of a second vehicle through connection with the second vehicle.

Accordingly, when the charging power supplying system using the motor driving system is used, a service for directly providing mobile charging equipment to a position in which a discharged electric vehicle is positioned may not be required, and thus the costs for establishing and managing a service infrastructure may be reduced, and worry for an upcoming customer who hesitates to purchase an electric vehicle due to inconvenience in the case of a discharge may be eased to contribute to market activation of electric vehicles.

It will be appreciated by persons skilled in the art that the effects that could be achieved with the present disclosure are not limited to what has been particularly described hereinabove and other advantages of the present disclosure will be more clearly understood from the above detailed description.

Accordingly, the aforementioned embodiments are exemplary in all aspects and are understood not to be limited. The scope of the present disclosure is defined by the following claims but not the above description and the meaning and scope of the claims and all modifications or modified forms from equivalents thereof are within the scope of the present disclosure.

What is claimed is:

1. A charging power supplying system using a motor driving system, comprising:
   an inverter that is connected to a battery, includes at least one switching device, and is configured to change an on/off state of the switching device and to convert power stored in the battery to output the converted power to an output terminal of the inverter;
   a motor including a plurality of coils that each receive power provided from the output terminal of the inverter;
   a charging power output terminal that is connected to a neutral point to which the plurality of coils of the motor is commonly connected and outputs current output from the neutral point to an external charging target; and a controller configured to control a switching device in the inverter based on current of the output terminal of the inverter such that an amplitude of current output to the charging power output terminal from the neutral point follows a preset current command, wherein the controller determines a duty of the switching device in the inverter based on a difference between a current detection value obtained by detecting current output from the neutral point and a preset neutral point current command, and direct current (DC) link voltage corresponding to voltage of a side of the battery of the inverter, and wherein the controller further includes a nonlinearity compensator configured to generate a nonlinearity compensation duty for compensating for nonlinearity of the inverter based on a detection value DC link voltage of the inverter and detection value of the neutral point current.

2. The charging power supplying system of claim 1, wherein the controller includes a current control device including a subtracter configured to calculate a difference between a current detection value obtained by detecting current output from the neutral point and a preset neutral point current command, a control device configured to generate a voltage command value for allowing a calculation result of the subtracter to converge on '0', and a divider configured to determine a first switching duty of the switching device in the inverter, which corresponds to a ratio of direct current (DC) link voltage corresponding to voltage of an input terminal of the side of the battery of the inverter and the voltage command value.

3. The charging power supplying system of claim 1, wherein the controller further includes:

an adder configured to add the first switching duty and the nonlinearity compensation duty to generate a correction duty.

4. The charging power supplying system of claim 3, wherein the controller further includes a current unbalance reduction control unit configured to correct the correction duty to allow a difference between an average value of detection values of currents flowing in coils with a plurality of phases of the motor and a detection value of each of the currents flowing in the coils with the plurality of phases to converge on '0', and to generate a separate duty determined for each switching device connected to the coils with the plurality of phases.

5. The charging power supplying system of claim 4, wherein the current unbalance reduction control unit includes:

a plurality of subtracters configured to each calculate a difference between the average value of the detection values of the currents flowing in the coils with the plurality of phases of the motor and the detection value of each of the currents flowing in the coils with the plurality of phases;

a plurality of control devices configured to each generate a duty value for allowing a calculated value of the plurality of subtracters to converge on '0'; and a plurality of adders configured to add the correction duty to each of duty values generated by the plurality of control devices to the correction duty to each generate a separate duty of the switching device in the inverter connected to the coils with the plurality of phases.

6. The charging power supplying system of claim 4, wherein the current unbalance reduction control unit includes:

a plurality of subtracters configured to each calculate a difference between an average value of the detection values of the currents flowing in the coils with the plurality of phases in the motor and a detection value of each of currents flowing in remaining phases except for one of currents flowing in coils with a plurality of phases;

a plurality of control devices configured to each generate a duty value for allowing a calculated value of the plurality of subtracters to converge on '0';

a first adder configured to change a sign of the duty values generated by the plurality of control devices and to add resulting values; and a plurality of second adders configured to add each of the duty values generated by the plurality of control devices and a duty value added by the first adder to the correction duty to respectively generate separate duties of the switching device in the inverter connected to the coils with the plurality of phases.

7. The charging power supplying system of claim 4, wherein the controller further includes a signal output unit configured to generate and output a switching device driving signal corresponding to the separate duty for driving the switching device.

8. The charging power supplying system of claim 7, wherein the signal output unit generates the switching device driving signal to perform interleaved switching on switching devices connected to each phase of the motor.

* * * * *